Aug. 21, 1956  E. B. MILLER  2,759,560
METHOD OF REMOVING WATER VAPOR AND RECOVERING CONDENSABLE
HYDROCARBONS FROM NATURAL GAS UNDER HIGH PRESSURE
Filed March 2, 1953  10 Sheets-Sheet 1

INVENTOR
ERNEST B. MILLER

BY *Adams & Bush*

ATTORNEYS

INVENTOR
ERNEST B. MILLER

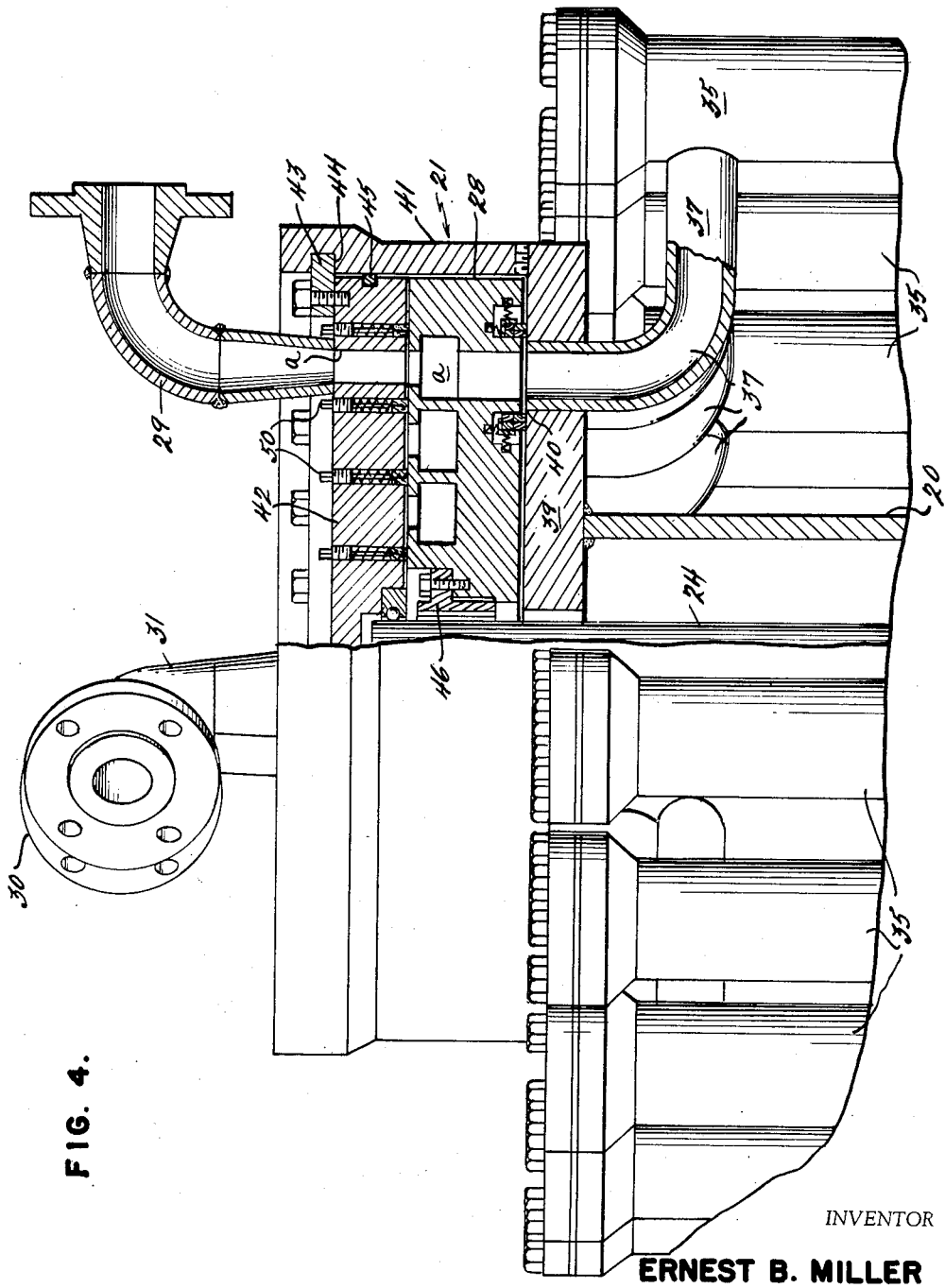

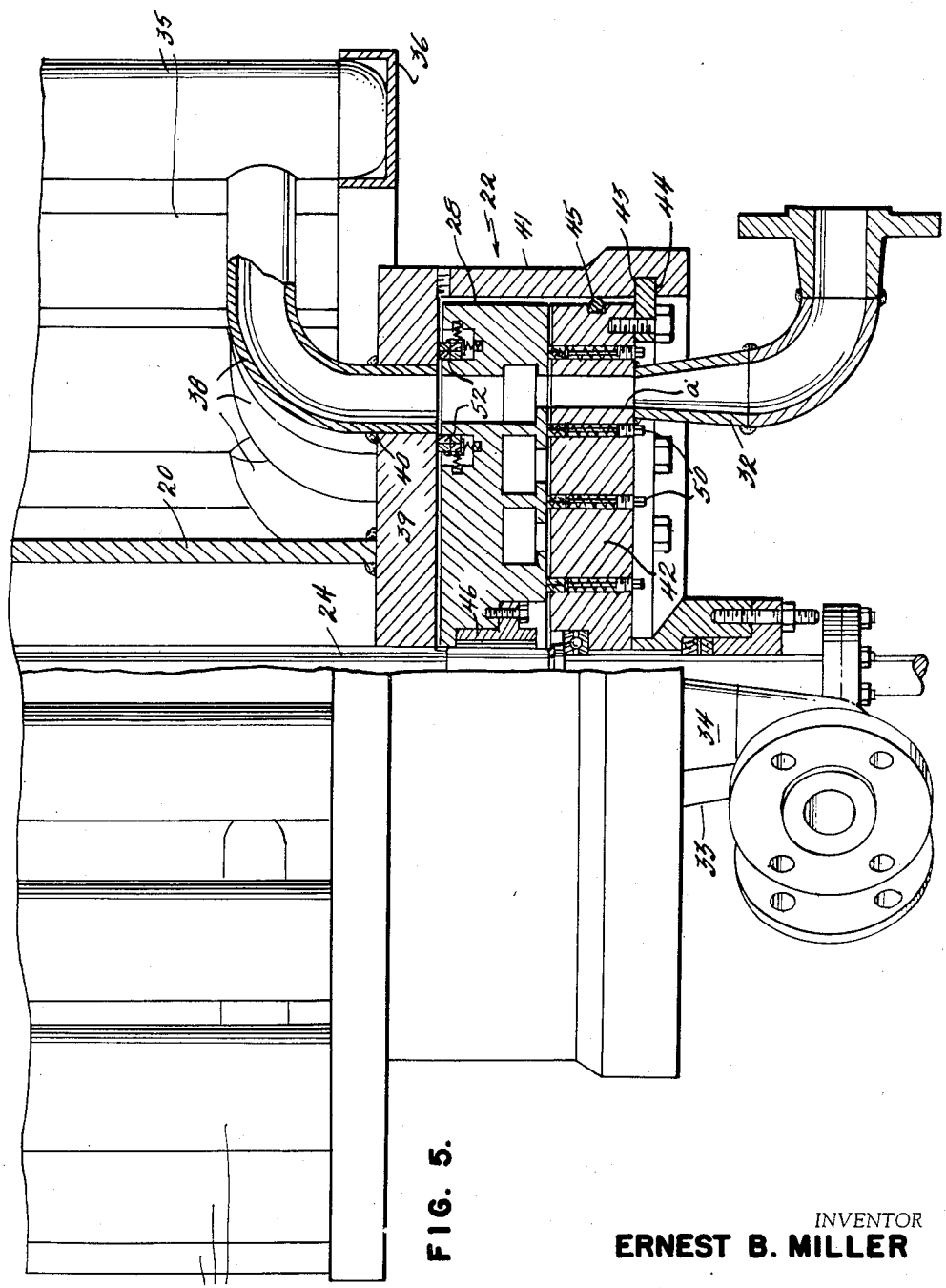

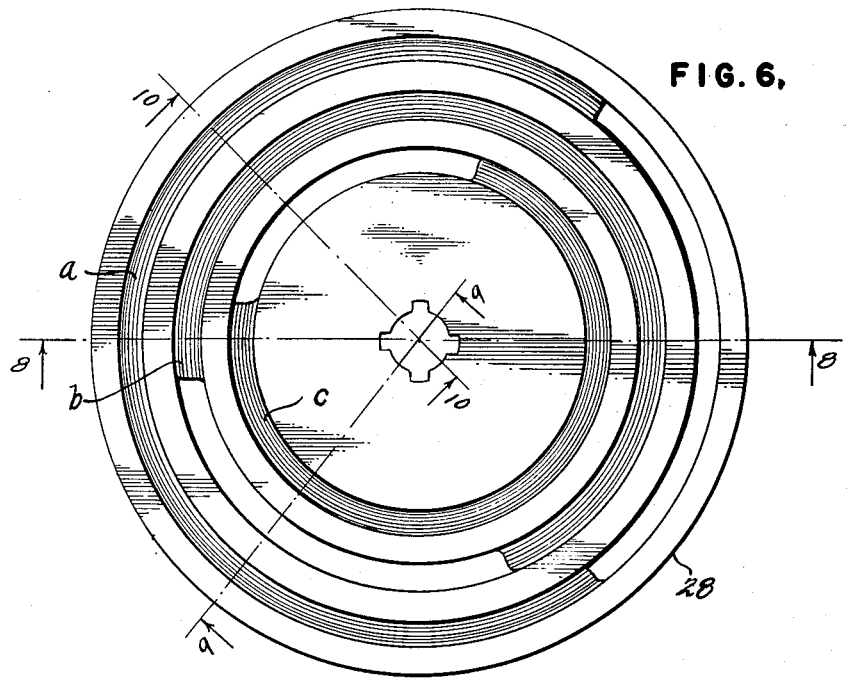
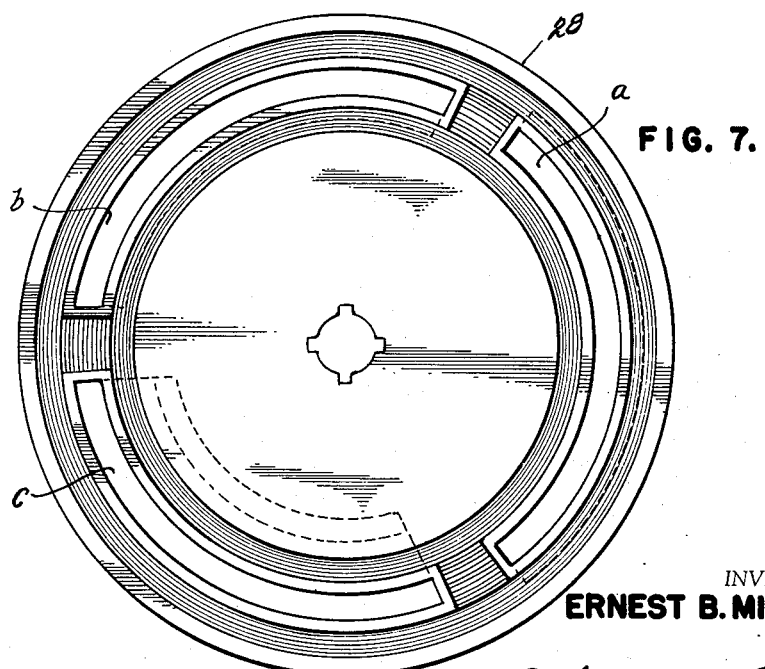

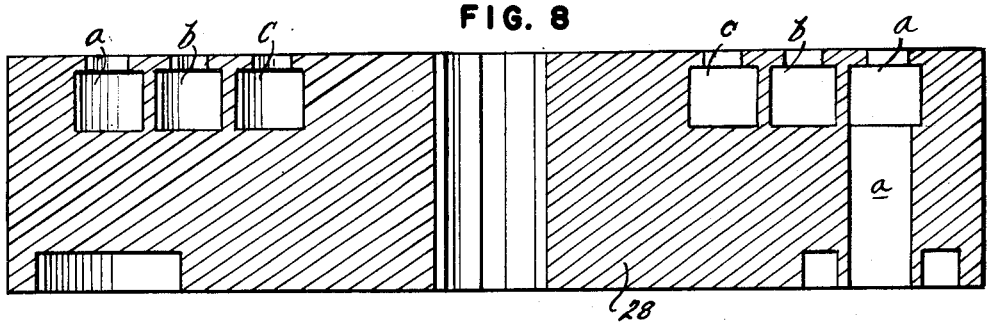
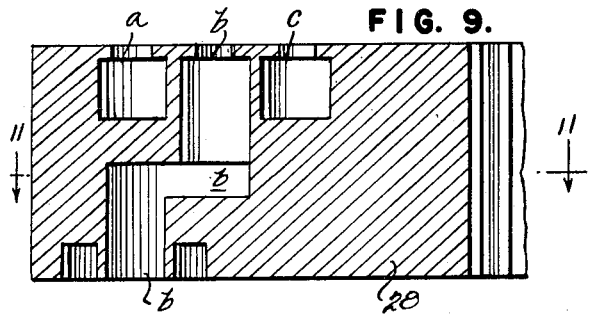
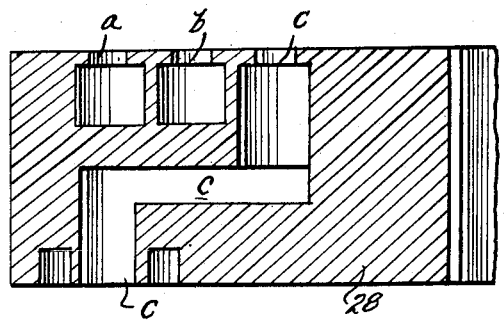
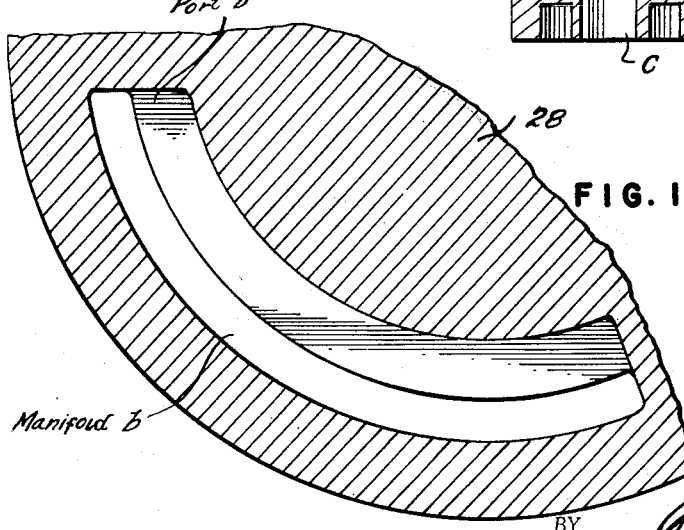
INVENTOR
ERNEST B. MILLER
ATTORNEYS

Aug. 21, 1956  E. B. MILLER  2,759,560
METHOD OF REMOVING WATER VAPOR AND RECOVERING CONDENSABLE
HYDROCARBONS FROM NATURAL GAS UNDER HIGH PRESSURE
Filed March 2, 1953  10 Sheets-Sheet 7

INVENTOR
ERNEST B. MILLER

BY *Adams & Bush*

ATTORNEYS

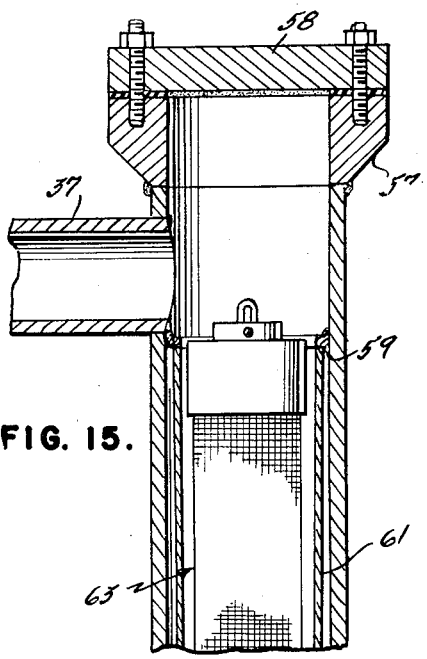
FIG. 15.
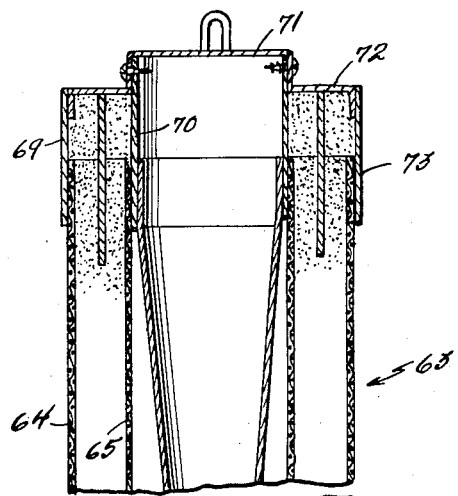
FIG. 16.
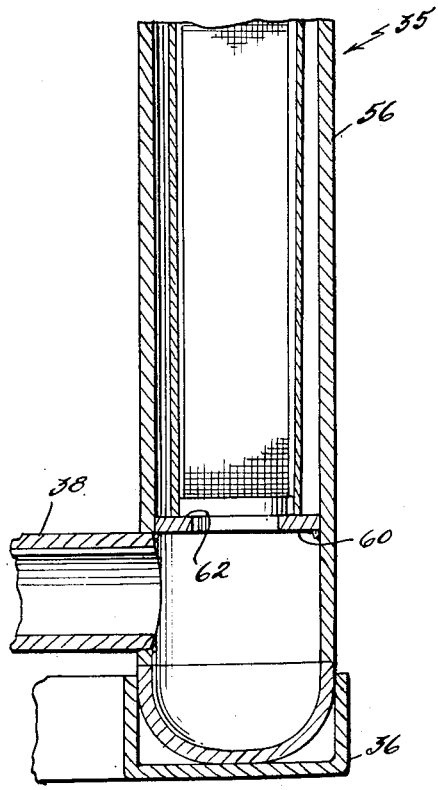
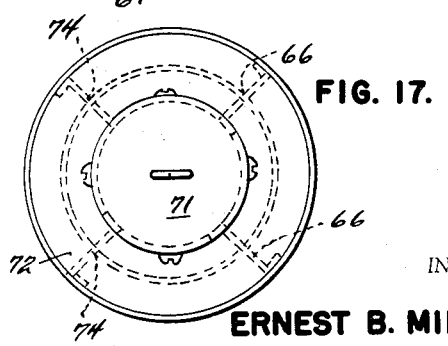
FIG. 17.
INVENTOR
ERNEST B. MILLER
BY *Adams + Bush*
ATTORNEYS

United States Patent Office 2,759,560
Patented Aug. 21, 1956

2,759,560

METHOD OF REMOVING WATER VAPOR AND RECOVERING CONDENSABLE HYDROCARBONS FROM NATURAL GAS UNDER HIGH PRESSURE

Ernest B. Miller, Houston, Tex., assignor to Jefferson Lake Sulphur Company, New Orleans, La., a corporation of New Jersey Application March 2, 1953, Serial No. 339,806

6 Claims. (Cl. 183—114.2)

This invention relates to gas dehydrating and has more particular reference to a novel and continuous method of removing moisture and condensable hydrocarbons from wet natural gas at the source, prior to the transmission thereof through pipe lines and recovering the condensable hydrocarbons.

Natural gas transmitted through pipe lines always contains moisture. This moisture forms crystalline hydrates which clog the pipe lines and valves. Heretofore, the moisture has been removed from the gas at the point of entrance to the pipe lines by using different types of adsorbents, principally, activated alumina and fluorite. The gas is usually pumped through large cylinders filled with the adsorbent material and the material is intermittently reactivated by cutting off the flow of gas and utilizing either heated air or gas. This requires the use of at least two adsorption units, including complicated control equipment, for directing the flow of wet gas through either unit.

Thus far, no attempt has been made to recover any gasoline as a by-product of the dehydration method. In fact, the usual adsorbents employed, such as alumina and fluorite, are not sufficient for this purpose because the size of their pores is too large.

One of the objects of the present invention is to provide a novel method of dehydrating wet gas using an adsorbent, such as silicate gel, and recovering a large percentage of the condensable hydrocarbons, such as gasoline, etc.

Another object of the present invention is to provide a novel method of recovering condensable hydrocarbons from wet natural gas under high pressure, which is characterized by maintaining at least one bed of adsorbent material in each of a plurality of zones forming a first group of zones and in each of a plurality of zones forming a second group of zones; directing a continuous flow of wet natural gas through all of the zones forming the first group of zones so that the water vapor and condensable hydrocarbons in the gas will be adsorbed by the beds of adsorbent material therein; continuously heating and directing the flow of gas through all of the zones forming the second group of zones to vaporize the water and condensable hydrocarbons contained in the beds of adsorbent material therein; shifting the flow of the wet natural gas and the flow of the heated gas through the two groups of zones by a simultaneous rotary movement so that the trailing zone, in the direction of rotation, in each group of zones will be transferred to the other group of zones whereby each zone will become, in succession, a dehydration zone and a reactivation zone; continuously withdrawing the heated gas from the zones in which reactivation is taking place, and condensing and recovering the water and condensable hydrocarbons from the withdrawn heated gas.

Another object of the invention is to provide a novel method of dehydrating wet natural gas under high pressure and recovering the condensable hydrocarbons therefrom, as characterized above, wherein the gas being treated is dehydrated in two or more stages.

Another object of the invention is to provide a novel method, as characterized above, wherein the flow of the gas being treated through the adsorbent material is countercurrent to the flow of the reactivating gas therethrough.

Another object of the invention is to provide a novel method, as characterized above, wherein the last dehydrating passage of the gas being treated is made through freshly reactivated adsorbent material.

A further object of the invention is to provide a novel method, as characterized above, wherein the reactivating gas is continuously heated and recycled through the dehydrater and a portion of the reactivating gas is continuously withdrawn from its recycling path after its passage through the reactivation stage of the dehydrater and the water and condensable hydrocarbons removed therefrom.

Other objects and advantages of the invention will appear in the specification when considered in connection with the accompanying drawings, in which:

Fig. 4 is a fragmentary elevational view, partly in vertical cross section and with parts broken away, showing the upper end of the apparatus shown in Fig. 1;

Fig. 5 is a view similar to that shown in Fig. 4, but showing the bottom end of the apparatus shown in Fig. 1;

Fig. 6 is a plan view of one surface of a rotatable disc valve, with the packing rings omitted;

Fig. 7 is a plan view of the other surface of the rotatable disc valve shown in Fig. 6, with the packing rings and seal packing omitted;

Fig. 8 is a vertical cross sectional view taken on the line 8—8 of Fig. 6;

Fig. 9 is a vertical cross sectional view, taken on the line 9—9 of Fig. 6;

Fig. 10 is a vertical cross sectional view, taken on the line 10—10 of Fig. 6;

Fig. 11 is a horizontal cross sectional view, taken on the line 11—11 of Fig. 9;

Fig. 15 is a vertical sectional view of one of the pressure vessels having a fluid treating material container mounted therein;

Fig. 16 is a vertical sectional view, with parts broken away, of the fluid treating material container shown in Fig. 15;

Fig. 17 is a plan view of the container shown in Fig. 16;

The present invention is drawn to a novel method of dehydrating wet natural gas under high pressure and recovering the condensable hydrocarbons therefrom. It is related to the method disclosed in my co-pending application, Ser. No. 155,956, filed April 14, 1950, now Patent No. 2,630,191, issued March 3, 1953, for Method of Dehydrating Natural Gas and Recovering Condensable Hydrocarbons Therefrom, in that the dehydration of the gas may be carried out in two or more stages, while one stage is employed for reactivation.

It is contemplated that the method of the present invention be carried out as a continuous process, treating gas direct from the wells, and at well pressure, which may be as high as 1000 pounds per square inch or more. The particular number of dehydration stages employed in the dehydrater will depend upon the moisture and natural gasoline content of the natural gas being treated.

While any suitable apparatus may be employed in carrying out the novel method of the present invention, for the purpose of illustration, the novel method will be described as employing the apparatus shown and described in the co-pending application, Ser. No. 315,309, filed October 17, 1952, for Fluid Treating Apparatus, by Dan Ringo and Ernest B. Miller.

Figure 18:
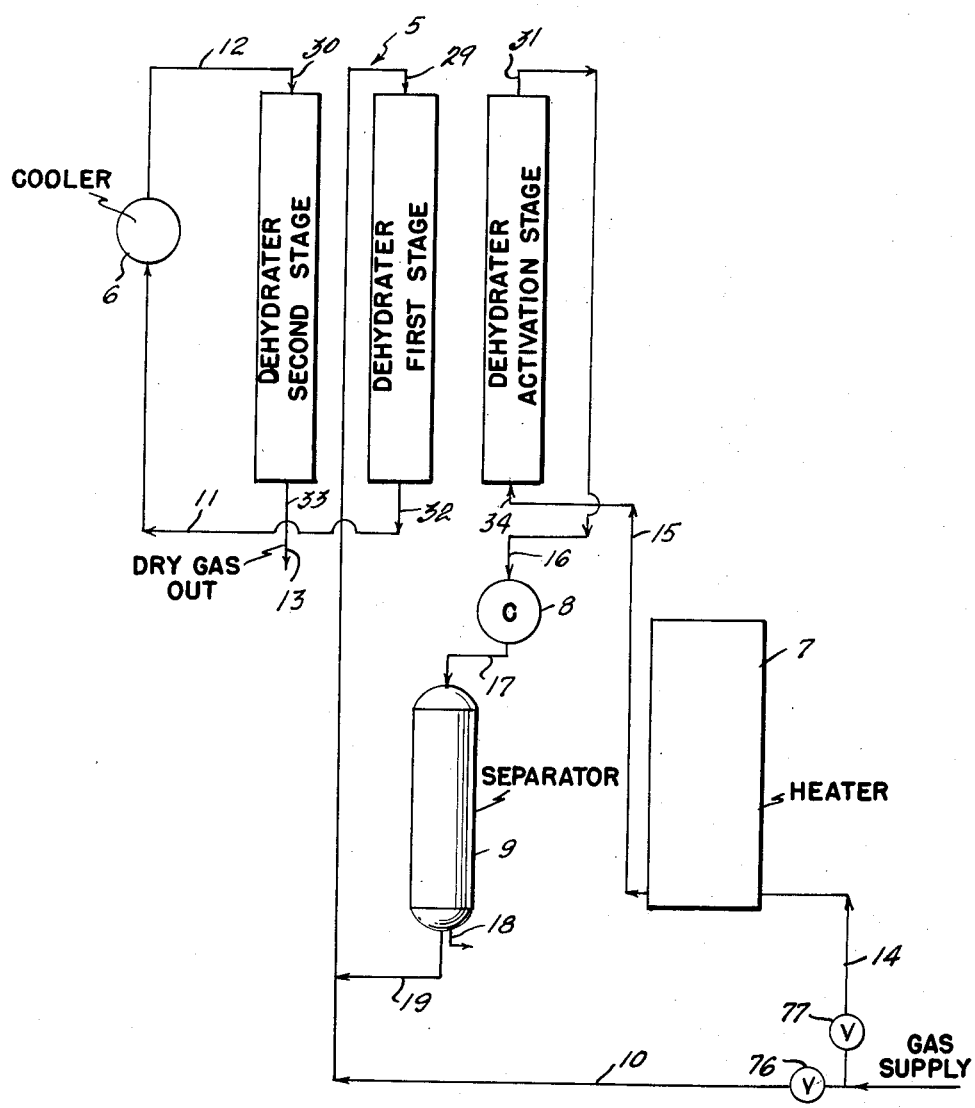
Fig. 18 is a schematic view showing the course of the fluid being treated through the first and second dehydration stages of the apparatus and the flow of regenerating fluid through the activation stage of the apparatus.

Referring now to the drawings, there is shown, in Fig. 18, one embodiment of apparatus and the arrangement thereof for carrying out the method of this invention. The apparatus shown includes a three stage dehydrater 5, the first and second stages of which are used to dehydrate the wet gas, the third stage being used to reactivate the adsorbent material within the dehydrater; an intercooler 6, employed to cool the wet gas between the first and second dehydration stages; a heater 7 employed to heat the gas used in the reactivating stage of the dehydrater; a condenser 8 employed to condense the moisture from the heated gas after it has passed through the reactivation stage of the dehydrater; and a separator 9 employed to separate the condensate from the gas.

The wet gas is delivered, at high pressure, from the usual compressor or source of supply (not shown), to the first stage of the dehydrater by means of a pipe line 10. After passing through the first stage of the dehydrater, during which passage some of the moisture and condensable hydrocarbons was removed, the now partially dried gas passes through a pipe line 11 into the intercooler 6. From the intercooler, the cooled, partially dry gas passes through a pipe line 12 into the second stage of the dehydrater, where it is completely stripped of its remaining moisture and condensable hydrocarbons. From the second stage, the now dry gas passes into a pipe line 13 for transmission to the points of use.

A portion of the wet gas is diverted from the supply pipe line 10, by means of a pipe line 14, through the heater 7, where its temperature is raised to from 300° F. to 600° F., depending upon the moisture content and the type of hydrocarbons to be recovered, and, from the heater, passes through a pipe line 15 into the third or reactivation stage of the dehydrater. The heated gas passes through the third stage, vaporizing and stripping the accumulated moisture and hydrocarbons from the adsorbent. The heated gas and the vapors stripped from the adsorbent pass through a pipe line 16 into the condenser 8, where the vapors are condensed; from the condenser, the gas and the condensates pass through a pipe line 17 into the separator 9 in which the condensate is separated from the gas. The separator is provided with a drain 18 for removing the water and hydrocarbons. The now cooled gas in the separator passes through a pipe line 19 back into the supply pipe line 10, where is mixes with the incoming wet gas on the way to the first stage of the dehydrater. The process is continuous.

The details of construction of the dehydrater 5 are shown in Figs. 1 to 17, inclusive. As there shown, the apparatus comprises an upright cylindrical pressure vessel 20; an upper cylindrical distribution chamber 21 secured to the top of the vessel 20; a lower cylindrical distribution chamber 22 secured to the bottom end of the vessel 20; a suitable framework, indicated generally at 23, for supporting the vessel 20 and the distribution chambers in a raised position; a rotatable vertical shaft 24 extending through the pressure vessel 20 and journaled and supported by suitable radial bearings mounted in the closure discs of the upper and lower distribution chambers, with its lower end extending through a suitable shaft seal secured to the bottom of the closure disc of the lower distribution chamber; a vertical shaft 25 coupled to the bottom end of the shaft 24 and connected to suitable differential gearing, indicated at 26, driven by a motor 27; a double-faced rotatable disc valve 28 mounted within each of the distribution chambers 21, 22 and fixedly secured on the shaft 24 for rotation therewith; a plurality of fluid inlet conduits, three being shown, 29, 30, 31, connected to the top of the upper distribution chamber 21 for admitting fluids thereto; a plurality of fluid outlet conduits, three being shown, 32, 33, 34 connected to the bottom of the lower distribution chamber 22 for exhausting fluids therefrom; and a plurality of fluid treating cylindrical pressure vessels 35 supported in a raised upright position encircling the vessel 20, by a suitable framework, indicated generally at 36, with each of the vessels having an inlet pipe 37 connecting its upper end portion to the bottom of the upper distribution chamber 21 and an outlet pipe 38 connecting its lower end portion to the top of the lower distribution chamber 22.

The upper and lower distribution chambers are identical in construction and, as shown in Figs. 4 and 5, each comprises an inner tube sheet disc 39 secured to an end of the cylindrical vessel 20, as by welding, and having a plurality of circular openings 40 extending therethrough, the openings being spaced from each other and formed in a circular row spaced inwardly from the periphery of the discs; a cylindrical collar 41 which forms the side wall of the chamber and which may be formed integral with the disc 39, as shown, or welded thereto; a closure disc 42 provided with three circumferentially and radially spaced inlet openings, which, for the purpose of clarity of description are designated a, b and c, respectively, secured in the outer end of the chamber, as by means of a split shear ring 43 bolted thereto and fitted into a circumferential recess 44 formed in the inner surface of the collar; and an O-ring packing 45 mounted between the closure disc 42 and the collar 41 to insure the gas-tightness of the chamber.

The three inlet conduits 29, 30, and 31, are secured to the closure disc 42 of the upper distribution chamber 21, as by welding, for communication with the interior of the chamber through openings a, b and c, respectively. The three outlet conduits 32, 33 and 34 are secured to the closure disc 42 of the lower distribution chamber 22, as by welding, for communication with the interior of the chamber through openings a, b and c, respectively. The upper ends of the inlet pipes 37 which connect the pressure vessels 35 to the upper distribution chamber 21, are fitted into the openings 40 formed in the tube sheet disc 39 of the upper distribution chamber. The lower ends of the outlet pipes 38 which connect the pressure vessels 35 to the lower distribution chamber 22, are fitted into the openings 40 formed in the tube sheet disc 39 of the lower distribution chamber.

The double-faced disc valves 28 are identical in construction and each is mounted within its respective distribution chamber between the tube sheet disc 39 and the closure disc 42 and is fixedly connected to the shaft 24 for rotation therewith, as by means of a splined collar 46 mounted on the shaft and bolted to the disc valve.

The details of construction of the double-faced disc valve 28 are best shown in Figs. 6 to 11, inclusive. As there shown, the upper face of the disc valve has a plurality of radially spaced concentric channels formed therein, three such channels being shown, and, for the purpose of clarity of description, designated fluid annulus $a$, $b$ and $c$, respectively (see Figs. 6 and 8). In the particular embodiment illustrated, the outer channel $a$ and inner channel $c$ are separated from the intermediate channel $b$ by walls which are T-shaped in cross section. The bottom face of the disc valve 28 has a plurality of circumferentially spaced arc-shaped channels formed therein, three such channels being shown, and, for the purpose of clarity, designated manifolds $a$, $b$ and $c$, respectively (see Figs. 7 and 8). The channels $a$, $b$ and $c$ are of the same length and have equal radii.

A plurality of generally trapezoidal-shaped circumferentially spaced passageways are formed in the disc valve, three such passageways being shown, and, for the purpose of clarity of description, designated ports $a$, $b$ and $c$, respectively. The port $a$ provides communication between a portion of the bottom of the annulus $a$ formed in the upper face of the disc valve and the manifold $a$ formed in the bottom face of the disc valve (see Fig. 8); the port $b$ provides communication between a portion of the bottom of the annulus $b$ and the manifold $b$ (see Figs. 9 and 11); and the port $c$ provides communication between the annulus $c$ and the manifold $b$ (see Fig. 10).

The disc valves 28 are mounted within their respective distribution chambers with their surfaces containing the manifolds $a$, $b$ and $c$ slightly spaced from the tube sheet discs 39 and with each of the manifolds in vertical alignment with a group of the circular openings 40 in the tube sheet discs and with their surfaces containing the annular channels $a$, $b$ and $c$ slightly spaced from the closure discs 42 and with the annular channels in vertical alignment with the inlet openings $a$, $b$ and $c$, respectively, formed in the closure discs 42.

The manner in which the annular channels $a$, $b$ and $c$ and the manifolds $a$, $b$ and $c$ are sealed off from the space within the distribution chambers is best shown in Figs. 4, 5, 12, 13 and 14. As there shown, the open tops of the annular channels $a$, $b$ and $c$ in the disc valve 28 are sealed off from the space between the closure disc 42 and the surface of the valve disc by means of annular seals 47, each seated in an annular recess formed in the inner surface of the closure disc with their lower ends pressed into engagement with the surface of the valve disc by means of split, flat, annular metal strips 48 resting on the upper ends of the seals and pressed downwardly thereon, as by means of a plurality of coiled springs 49 mounted in circumferentially spaced vertical openings extending through the closure disc with an adjusting and pressure sealing plug 50 threaded in each opening for adjusting the pressure of the spring. Each of the adjusting plugs may be provided with a depending stem 51 extending downwardly through the spring to hold it in upright position. Each of the seals 47, preferably, and as shown, comprises a plurality of annular strips of packing generally rectangular in cross section and made of any suitable material, such as teflon or silica impregnated asbestos.

The open bottoms of the three manifolds $a$, $b$ and $c$ formed in the disc valve 28 are sealed off from the space between the inner surface of the disc 39 and the disc valve by means of annular seals 52, each seated in an annular recess formed in the inner surface of the disc valve with their lower ends pressed into sealing engagement with the surface of the disc 39.

Figure 12:
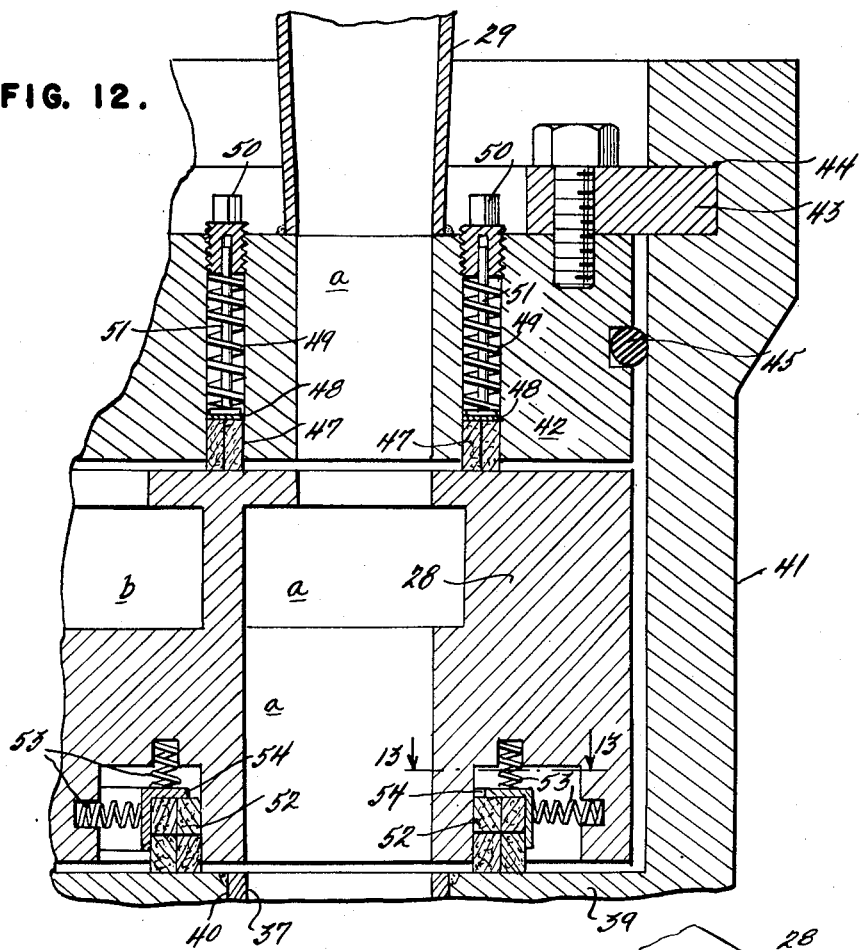
Fig. 12 is a fragmentary detail view showing the manner in which the packing rings between the rotatable disc valve and the stationary end wall members of the distribution chambers are mounted.
Figure 13:
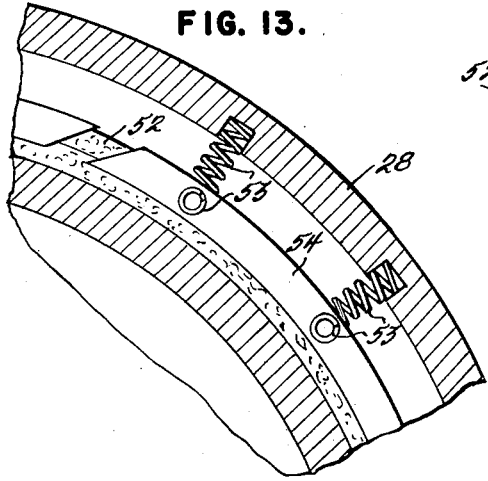
Fig. 13 is a horizontal cross sectional view, taken on the line 13—13 of Fig. 12.
Figure 14:
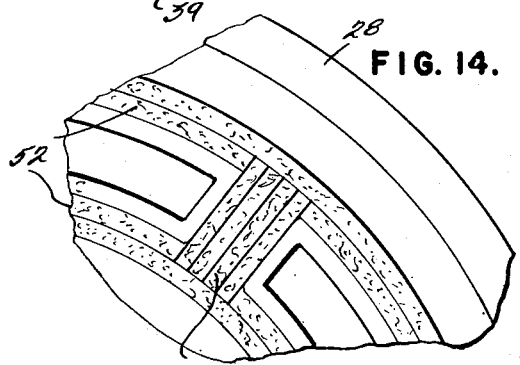
Fig. 14 is a fragmentary detail view showing the manner in which the packing is mounted in a cross-seal.

Each of the annular seals 52 is pressed into engagement with the inner surface of the disc 39 and the side walls of the recess in which the seal is mounted, adjacent the manifold, as by means of a plurality of circumferentially spaced coiled springs 53 fitted into the circular recesses formed in the top and a side wall of the recess and engaging the top and side legs of a split annular retaining ring 54, made of angle iron (see Figs. 12 and 13). Each of the seals 52, preferably, and as shown, comprises a plurality of annular strips of packing, generally rectangular in cross section and made of any suitable material such as teflon or silica impregnated asbestos.

Obviously, any leakage of fluids past the seals 47 and 52 into the distribution chamber and the pressure vessel 20 serves to equalize the pressure on both sides of the seals and increases their sealing efficiency. The O-ring packings 45 and the shaft seal serve to prevent leakage from the distribution chambers and the pressure vessel 20.

The three manifolds $a$, $b$ and $c$ are sealed off from each other by means of cross seals 55, each seated in a radially extending recess formed in the surface of the disc valve between the adjacent end walls of the manifolds $a$, $b$ and $c$ and opening into the adjacent annular recess in which the annular seals 52 are seated. Each cross seal is tightly wedged in its recess with its ends in sealing engagement with the adjacent side walls of the annular seals 52 and with its bottom surface pressed into tight sealing engagement with the inner surface of the disc 39 (see Fig. 14).

The widths of the manifolds $a$, $b$ and $c$ are substantially the same as the internal diameters of the circular openings 40 in the tube sheet discs 39 and each of the cross seals 55 is of a width greater than the diameters of the circular openings 40, so that each cross seal can effectively seal off one of the openings 40.

Each of the openings 40 formed in the tube sheet disc 39 of the lower distribution chamber 22 is in vertical alignment with a corresponding one of the openings 40 formed in the tube sheet disc 39 of the upper distribution chamber 21 and each of the three cross seals 55 which separate the manifolds $a$, $b$ and $c$ formed in the lower valve disc 28 is in vertical alignment with a corresponding one of the cross seals 55 which separate the manifolds $a$, $b$ and $c$ formed in the upper valve disc 28.

When the rotary disc valves 28 are stationary, the foregoing arrangement, in effect, divides the pressure vessels 35 into three groups or stages, with one group connected to communicate with the manifolds $a$, one group connected to communicate with the manifolds $b$, and one group connected to communicate with the manifolds $c$, so that three separate, distinct and continuous flows of fluid may pass through the apparatus. Each flow entering the upper distribution chamber 21 by means of one of the inlet conduits 29, 30 or 31, thence through one of the groups of pressure vessels 35 into the lower distribution chamber 22 and out through one of the outlet conduits 32, 33 or 34. As the upper and lower disc valves rotate, each of the flows of fluid will successively pass through each of the pressure vessels 35 in each of the three groups.

Obviously, the respective pairs of manifolds $a—a$, $b—b$ and $c—c$ may be of different lengths so that the number of pressure vessels in communication with one pair of manifolds may be different from the number in communication with the other pairs of manifolds, if desired.

The adsorbent material containing pressure vessels 35 are identical in construction and, as shown in Fig. 15, each comprises an elongated, hollow, cylindrical member 56 having a closed rounded bottom end and an open upper end provided with an integral flange 57, to which is secured, as by bolting, a removable cover plate 58.

Horizontally disposed and vertically spaced annular discs 59, 60 are mounted in the upper and lower end portions, respectively of the member 56 and secured therein, as by welding, to form a gas-tight joint between the outer peripheral edges of the discs and the side walls of the member 56. The diameter of the opening in the upper disc 59 is greater than the diameter of the opening in the lower disc 60 and a generally frusto-conically shaped, hollow baffle member 61 extends between the discs 59 and 60 with its top end fitted in the opening in the upper disc 59 and its lower end secured to the disc 60, as by welding, along a circle spaced outwardly from the peripheral edge of the opening therein to leave an annular ledge 62 surrounding the opening. The annular ledge 62 forms a support for an elongated annular fluid treating material container 63. The container 63 is removably mounted within the frusto-conically shaped baffle member 61, with its bottom end resting on the ledge 62 and with its upper end extending through the opening in the upper disc 59.

The inlet pipe 37 is connected, as by welding, to the vessel 35 at a point above the upper annular disc 59 and the outlet pipe 38 is connected, as by welding, to the vessel 35 at a point below the lower annular disc 60, as shown in Fig. 15.

The containers 63 are identical in construction and, as shown in Figs. 16 and 17, each comprises two concentric tubular screens 64, 65 held in spaced-apart relation by a plurality of longitudinal radial fins 66, with the annular space between the screens closed at the bottom, as by a flanged annular plate 67. The mesh of the screens is such as to retain a granular fluid treating material 68 in the annular space between the screens. In the instant case, the adsorbent material 68 may be any adsorbent having characteristics substantially like silica gel or the gel of other activated hydrous oxides. Preferably, silica gel is used.

Each of the containers 63 is closed at its top by means of concentric hoops or metal bands 69, 70 mounted on the concentric screens 64, 65, and a cover plate 71 detachably connected to the inner hoop or band 70, as by screws, and having a depending annular flange 72 fitting between the hoops or bands 69, 70. A depending cylindrical fin 73 is secured to the flange 72 and projects downwardly between and below the hoops or bands 69, 70, and fits in slits 74 formed in the upper ends of the radial fins 66, all as shown in Figs. 16 and 17. The construction is such that, as the silica gel settles down, leaving a space between the top portion of the wire screens devoid of silica gel, the fin 73 will prevent fluid from passing through the space.

Mounted within the inner wire screen 65 is an inverted substantially conically-shaped baffle member 75. The baffle member 75 is closed at its apex which extends downwardly to a point near the bottom of the container and has its upper peripheral edge suitably secured to the band 70, as by welding. Preferably, the baffle member 75 is made of thin sheet metal.

When the container 65 is mounted within the hollow member 61, as shown in Fig. 15, the elongated annular space between the walls of the member 61 and the inverted conical baffle member 75 forms an elongated frusto-conically shaped duct which is annular in cross section. The annular container, filled with silica gel, is positioned in the duct between the members 61 and 75 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the baffle members 61 and 75, the entire barrier area is made use of with resultant increase in efficiency, capacity, and economy.

The flows of the natural gas and the reactivating gas through the various stages of the dehydrater and the auxiliary apparatus are schematically shown in Fig. 18.

As there shown, the wet natural gas from which moisture and condensable hydrocarbons are to be removed, is supplied under high pressure by pipe line 10 and enters the upper distribution chamber 21 of the dehydrater through inlet conduit 29 and passes through inlet opening $a$ in the closure disc 42 into the annular channel or annulus $a$ formed in the upper surface of the valve disc 28. From annulus $a$ the gas passes through port $a$ into manifold $a$ formed in the bottom surface of the valve disc 28. From the manifold $a$ the gas passes through openings 40 formed in the tube sheet disc 39 and inlet pipes 37 into the upper end portions of the group of pressure vessels 35 which are at that time in communication with manifold $a$. The gas passes down through the vessels 35 and through the silica gel beds therein into the bottoms of the vessels. The baffle members 61 and 75 within the vessels 35 insure a substantially uniform flow and distribution of the wet gas through the silica gel beds which adsorb some of the moisture content from the gas. From the bottoms of the vessels 35 the now partially dried gas passes through outlet pipes 38 and openings 40 in the tube sheet disc 39 in the lower distribution chamber into the manifold $a$ formed in the upper surface of the valve disc 28. From the manifold $a$ the gas passes through port $a$ into the channel or annulus $a$ formed in the bottom surface of the valve disc 28 and thence through opening $a$ in the closure disc 42 into the outlet conduit 32.

From the outlet conduit 32, the partially dried gas passes through pipe line 11 into the intercooler 6, where it is cooled. The intercooler 6 may be of the water circulating type. From the intercooler, the gas passes through pipe line 12, inlet conduit 30, and inlet opening $b$ in the closure disc 42 of the upper distribution chamber 21, into the annular channel or annulus $b$ in the upper valve disc 28. From the annulus $b$ the gas passes through port $b$ into manifold $b$ in the bottom of the valve disc 28. From the manifold $b$ the gas passes through openings 40 formed in the disc 39 and inlet pipes 37 into the end portions of the group of pressure vessels 35 which are at the time in communication with manifold $b$. The gas passes downwardly through the pressure vessels 35 of the second group and through the silica gel beds therein into the bottoms thereof. The remainder of the moisture content of the gas being adsorbed during its passage through the silica gel beds.

From the bottoms of the vessels 35 of the second group, the now dried gas passes through outlet pipes 38 and openings 40 in the tube sheet disc 39 in the lower distribution chamber into manifold $b$ in the upper surface of the lower disc valve 28. From the manifold $b$ the gas passes through port $b$ into the annular channel or annulus $b$ formed in the bottom surface of the valve disc 28 and thence through outlet opening $b$ in the closure disc 42 into the outlet conduit 33 and pipe line 13, and from thence to the various points of use.

A portion of the incoming wet gas is diverted from the supply line 10 by means of a pipe line 14, through the heater 7, where its temperature is raised to from 300° F. to 600° F., depending upon the moisture content and the type of hydrocarbons to be recovered. From the heater 7, the heated gas passes through pipe line 15, inlet conduit 34, and inlet opening $c$ in the closure disc 42 of the lower distribution chamber 22, into annular channel or annulus $c$ in the lower disc valve 28. From the annulus $c$ the heated gas passes through port $c$ into manifold $c$ in the top of the disc valve 28. From the manifold $c$ the gas passes through openings 40 formed in the tube sheet disc 39 and inlet pipes 38 into the lower end portions of the group of pressure vessels 35 which are at that time in communication with the manifold $c$. The heated gas passes upwardly through the pressure vessels of the third group and through the silica gel beds therein into the tops of the vessels. As the heated gas passes through the silica gel beds it removes the moisture and hydrocarbons therefrom. From the tops of the vessels 35 of the third group, the hot, moisture and hydrocarbon laden gas passes through outlet pipes 37 and openings 40 in the tube sheet disc 39 in the upper distribution chamber 21 into manifold $c$ in the lower surface of the upper valve disc 28. From the manifold $c$ the gaseous mixture passes through port $c$ into the annular channel or annulus $c$ formed in the top surface of the valve disc 28 and thence through outlet opening $c$ in the closure disc 42 into the outlet conduit 31 and from there through pipe line 16 into condenser 8, where the moisture and hydrocarbons are condensed. The now cooled gas, with the condensate, pass from the condenser 8 through pipe line 17 to the separator 9, where the condensate is separated from the gas. The water and hydrocarbons are drained from the bottom of the separator by means of a drain line 18.

From the separator 9, the gas passes through pipe line 19 back into the supply line 10, where it is mixed with the incoming gas on the way to the first passage through the apparatus.

The gas being dehydrated makes two passages through groups of the silica gel containing pressure vessels, while the heated gas or reactivating medium makes a single passage through a group of the silica gel containing pressure vessels. For convenience in description, the pressure vessels which form the group through which the first dehydrating passage is made is called the first dehydration stage, the group through which the second dehydrating passage is made is called the second dehydration stage, and the group through which the hot gas used for reactivation passes is called the reactivation stage. Also, the pressure vessels are called zones in which either dehydration or reactivation takes place, depending upon the particular fluid flowing therethrough at a given time. As the disc valves 28 are rotated, the flows of the natural gas and the flow of the heated gas through the respective groups of pressure vessels or zones communicating with the manifolds $a$, $b$ and $c$ in the upper and lower distribution chambers, respectively, are shifted by a simultaneous rotary movement so that the trailing zone, in the direction of rotation, in each group will be transferred to the adjacent following group, whereby each zone will become, in succession a dehydration zone and a reactivation zone.

Figure 1:
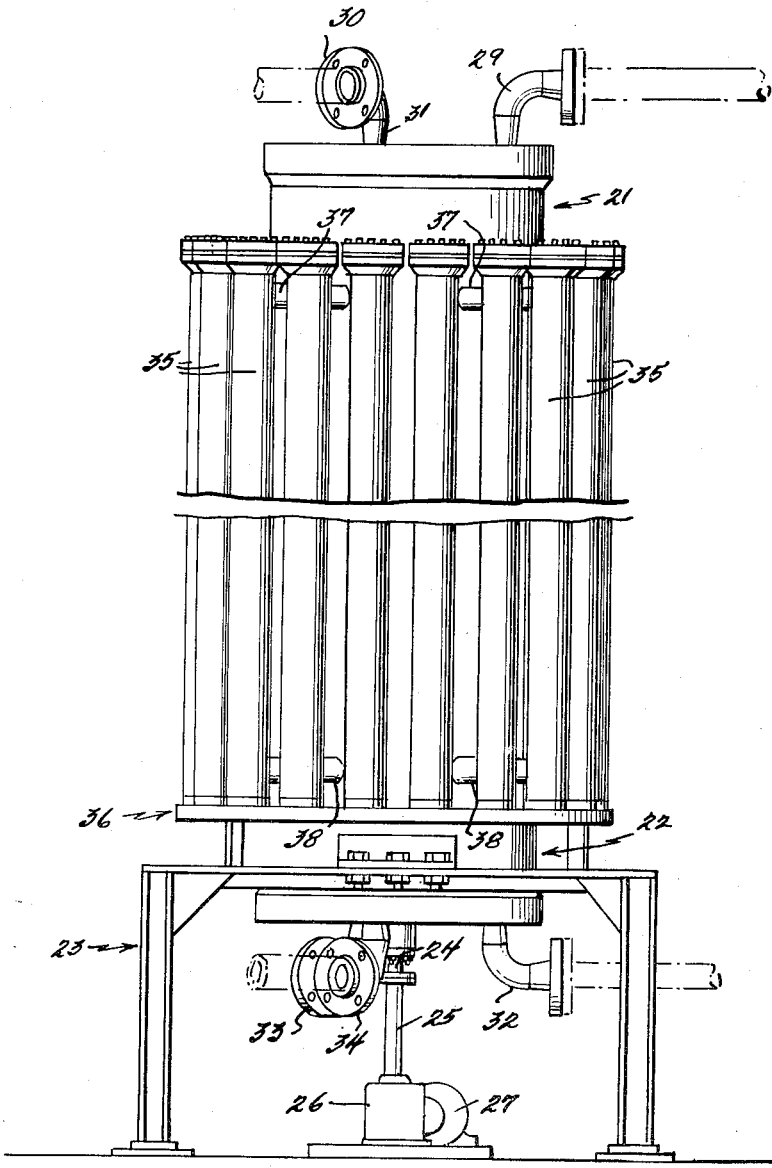
Fig. 1 is a side elevational view of one embodiment of fluid treating apparatus used in carrying out the method of the present invention.
Figure 2:
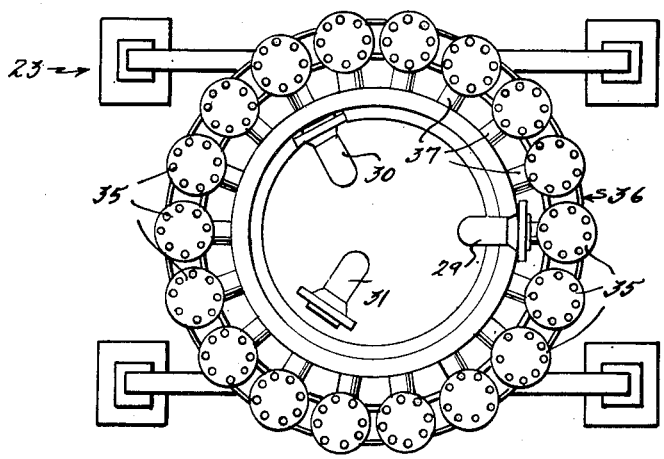
Fig. 2 is a plan view of the apparatus shown in Fig. 1.
Figure 3:
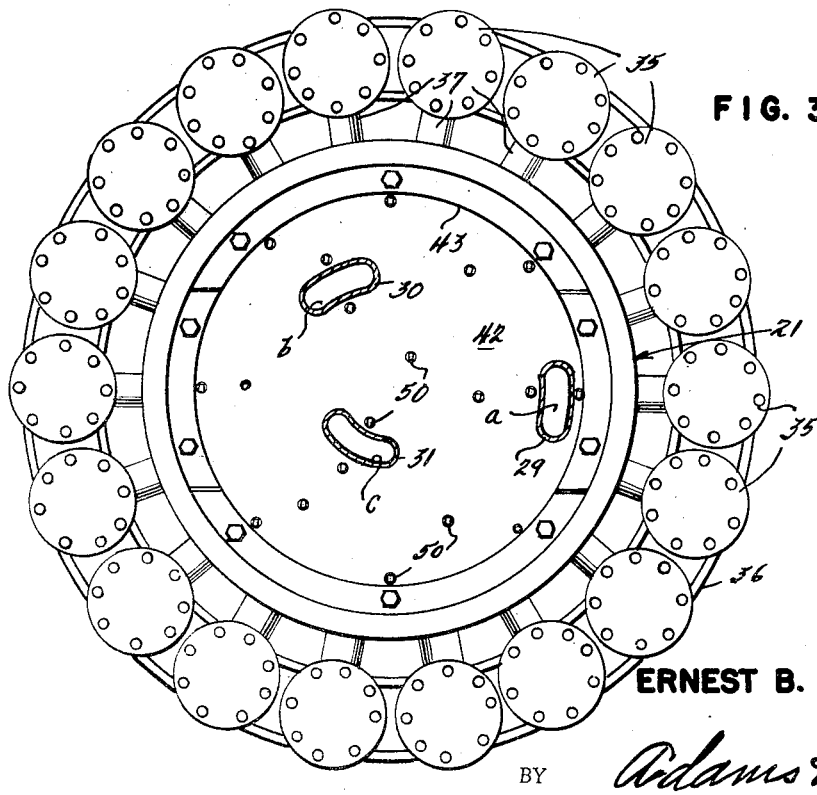
Fig. 3 is a plan view, on a larger scale, of the apparatus shown in Fig. 1, with the inlet conduits broken away.

In the particular embodiment of the invention illustrated, the valve discs 28 are rotated counterclockwise, as viewed in Fig. 2, and at a rate of 1 revolution every 10 minutes; thus, it will be seen that, as the disc valves 28 rotate, each of the pressure vessels 35 will be successively brought into communication with the manifolds $a$, $b$ and $c$ in the upper and lower distribution chambers, so that each pressure vessel 35 will, in turn, become a second dehydration zone, a first dehydration zone, and an activation zone.

Suitable stop valves 76 and 77 are located in pipe lines 10 and 14, respectively, to provide means for controlling the flow of gas through the dehydration and activation stages of the dehydrater.

Figure 19:
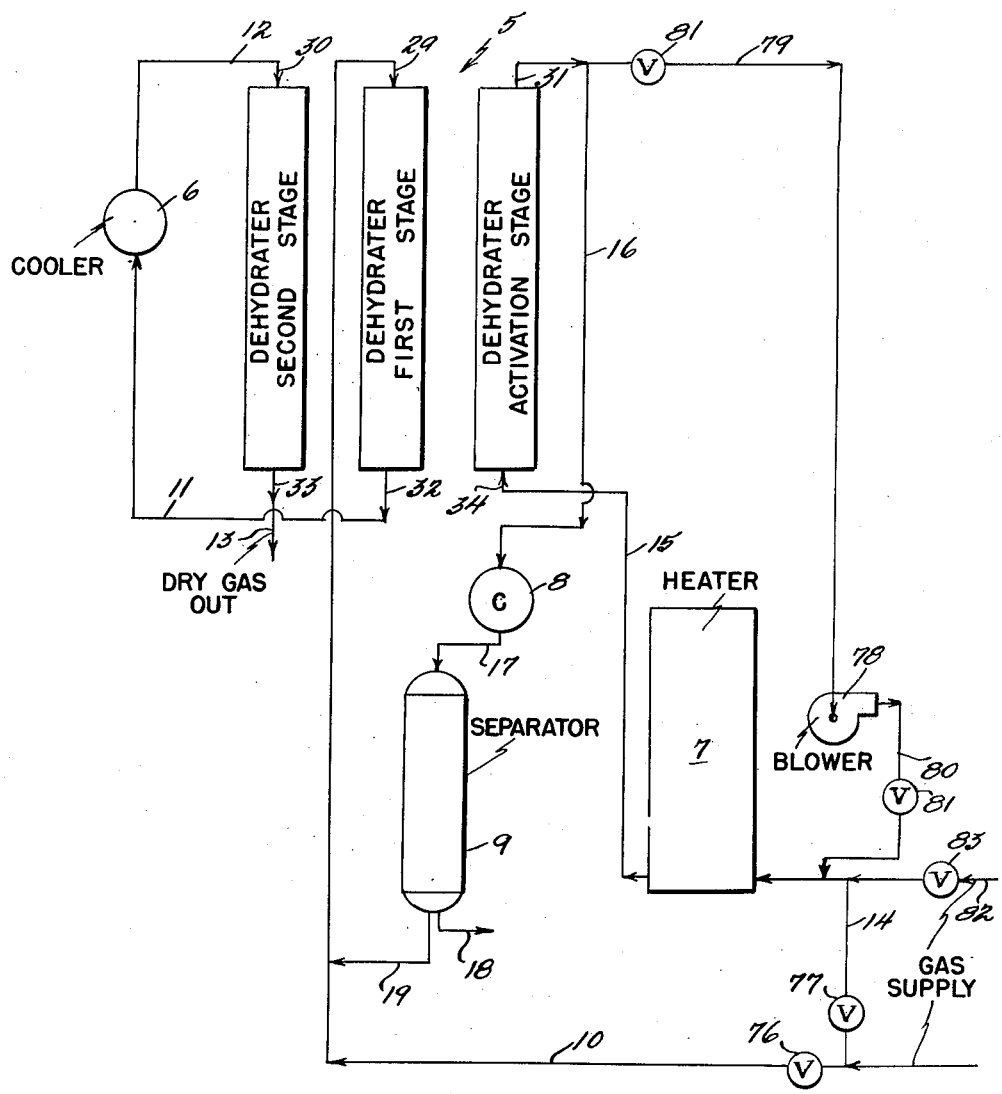
Fig. 19 is a schematic view to show a modification of the flow of hot gas through the activation stage, the condenser, and separator.

In Fig. 19, there is shown a modification of the activation cycle. This modification is an alternative to that shown in Fig. 18 and is preferably used in cases where the quantity of condensable vapors to be recovered from the gas is quite large.

The additional apparatus shown comprises a low pressure blower 78 for recirculating the hot gas through the heater and the activation stage of the dehydrator; a pipe line 79 connecting the inlet side of the blower 78 to pipe line 16; and a pipe line 80 connecting the exhaust side of the blower to pipe line 14. Stop valves 81 are mounted in the pipe lines 79 and 80 to permit cutting off the circulation of gas through these pipe lines when desired.

In the modification shown in Fig. 19, the circulation of the wet gas through the first and second stages of the dehydrater is unchanged. The circulation of the heated gas through the heater and activation stage of the dehydrater is modified as shown to permit the continuous recirculation of the heated gas.

A portion of the hot gas and vapor stripped from the adsorbent in the activation stage is continuously withdrawn through pipe line 16 and passes through the condenser 8 where the moisture and condensable hydrocarbons are condensed. From the condenser, the gas and the condensate pass through pipe line 17 to the separator 9 where the condensate is separated from the gas. The water and hydrocarbons are drained from the bottom of the separator by means of drain line 18. From the separator the gas passes through pipe line 19 back into the supply line 10, where it is mixed with the incoming gas on the way to the first dehydration stage.

The greater portion of the hot gas after its passage through the activation stage passes into pipe line 79 and is recirculated by the low pressure blower 78 through the pipe line 80 and the heater 7 back through the activation stage of the dehydrater. The process is continuous.

When the recirculating system is used, the valve 76 is closed enough to force wet gas through the heater via valve 77 and pipe line 14, the valve 77 being used to regulate the exact quantity of such gas permitted to flow to the heater. The raw gas fed into the activation circuit is for the purpose of reducing the partial pressure of water vapor and condensable hydrocarbons in the activation stage, thereby facilitating the removal of such adsorbed products from the silica gel. The quantity of gases recirculated by the blower is dictated by the amount of heat required to heat up the silica gel in the activation stage and vaporize the water and hydrocarbons adsorbed therein. The valves 81 provide for controlling the quantities of recirculated gases. The recirculation of the hot gas through the activation stage is facilitated due to the thinness of the adsorbent in the tubular containers.

While the blower 78 has been described as a low pressure blower, it actually has to stand the full pressure of the system, and is low pressure only in the sense that it does not have to overcome much resistance in order to recirculate gases through the heater and activation stage of the dehydrater.

While the gas used for reactivating the adsorbent has been shown as being obtained from the supply line 10, obviously, a different source could be used, as well as a different kind of gas, such as air or steam.

For this purpose, a pipe line 82 having a stop valve 83 mounted therein has been shown as connected to pipe line 14. The pipe line 82 being connected to a suitable source of gas (not shown). By closing valve 77, the gas for the recirculating circuit may be obtained through pipe line 83.

Obviously, the invention is not restricted to the particular embodiment thereof herein shown and described. Moreover, it is not indispensable that all of the features of the invention be used conjointly, since they may be employed advantageously in various combinations and subcombinations.

What is claimed is:

1. In the removal of water vapor and condensable hydrocarbons from wet natural gas involving the contact of adsorbent material with the natural gas with resultant adsorption of the water vapor and condensable hydrocarbons by the adsorbent material and the subsequent treatment of the adsorbent material with a heated medium to vaporize and remove the water vapor and condensable hydrocarbons and thereby reactivate the adsorbent material for further contact with the natural gas, the improvement which comprises providing at least one bed of adsorbent material in each of a plurality of zones forming a first group of zones and in each of a plurality of zones forming a second group of zones, with all of said zones having their inlet and outlet openings circumferentially spaced about a common axis; directing a continuous flow of wet natural gas through all of the zones forming the first group of zones so that the water vapor and condensable hydrocarbons in the gas will be adsorbed by the beds of adsorbent material therein; continuously heating and recycling a flow of the gas through all of the zones forming the second group of zones to vaporize the water and condensable hydrocarbons contained in the beds of adsorbent material therein, redirecting the flow of the wet natural gas and the flow of the heated gas through the two groups of zones by shifting the flow passages by a simultaneous rotary movement of the gas paths so that as the gas paths rotate the last zone, in the direction of rotation, in each group of zones will be transferred to the other group of zones whereby each zone will become in succession a dehydration zone and a reactivation zone; continuously withdrawing a portion of the heated gas from its recycling path after its passage through the dehydrater; condensing and recovering the water vapor and condensable hydrocarbons from the withdrawn hot gas; and continuously supplying additional gas to the recycled gas to compensate for the gas withdrawn.

2. In the removal of water vapor and condensable hydrocarbons from wet natural gas involving the contact of adsorbent material with the natural gas with resultant adsorption of the water vapor and condensable hydrocarbons by the adsorbent material and the subsequent treatment of the adsorbent material with a heated medium to vaporize and remove the water vapor and condensable hydrocarbons and thereby reactivate the adsorbent material for further contact with the natural gas, the improvement which comprises providing at least one bed of adsorbent material in each zone of a plurality of groups of zones, with all of said zones having their inlet and outlet openings circumferentially spaced about a common axis; continuously heating and recycling a flow of gas through all of the zones of one group of said groups of zones to vaporize the water and condensable hydrocarbons contained in the beds of adsorbent material therein; continuously directing the flow of the natural gas in succession and in series through the remaining groups of said groups of zones so that the water vapor and condensable hydrocarbons in the natural gas will be adsorbed by the beds of adsorbent material therein; redirecting the flows of the natural gas and the flow of the heated gas through said groups of zones by shifting the flow passages by a simultaneous rotary movement of the gas paths so that as the gas paths rotate the last zone, in the direction of rotation, in each group of zones will be transferred to the adjacent following group of zones whereby each zone will become in succession a dehydration zone and a reactivation zone; continuously withdrawing a portion of the heated gas from its recycling path after its passage through the dehydrater; condensing and recovering the water and condensable hydrocarbons from the withdrawn hot gas; and continuously supplying additional gas to the recycled gas to compensate for the gas withdrawn.

3. The method as set forth in claim 2, wherein the gas used for reactivating the beds of adsorbent material is natural gas and wherein the withdrawn gas from the recycling path is directed into the flow of the gas being treated after being stripped of its water vapor and condensable hydrocarbons.

4. The method as set forth in claim 1, wherein the gas used for reactivating the beds of adsorbent material is natural gas and wherein the withdrawn gas from the recycling path is directed into the flow of the gas being treated after being stripped of its water vapor and condensable hydrocarbons.

5. In the removal of water vapor and condensable hydrocarbons from wet natural gas involving the contact of adsorbent material with the natural gas with resultant adsorption of the water vapor and condensable hydrocarbons by the adsorbent material and the subsequent treatment of the adsorbent material with a heated medium to vaporize and remove the water vapor and condensable hydrocarbons and thereby reactivate the adsorbent material for further contact with the natural gas, the improvement which comprises providing at least one bed of adsorbent material in each of a plurality of zones, with all of said zones having their inlet and outlet openings circumferentially spaced about a common axis; directing a continuous flow of wet natural gas through some of said zones so that the water vapor and condensable hydrocarbons in the gas will be adsorbed by the beds of adsorbent material therein; continuously heating and recycling a flow of gas through the remainder of said zones to vaporize the water and condensable hydrocarbons contained in the beds of adsorbent material therein; redirecting the flow of the wet natural gas and the flow of the heated gas through the zones by shifting the flow passages by a simultaneous rotary movement of the gas paths so that each zone will become in succession a dehydration zone and a reactivation zone; continuously withdrawing a portion of the heated gas from its recycling path after its passage through the dehydrater; condensing and recovering the water vapor and condensable hydrocarbons from the withdrawn hot gas; and continuously supplying additional gas to the recycled gas to compenate for the gas withdrawn.

6. In the removal of water vapor and condensable hydrocarbons from wet natural gas involving the contact of adsorbent material with the natural gas with resultant adsorption of the water vapor and condensable hydrocarbons by the adsorbent material and the subsequent treatment of the adsorbent material with a heated medium to vaporize and remove the water vapor and condensable hydrocarbons and thereby reactivate the adsorbent material for further contact with the natural gas, the improvement which comprises providing at least one bed of adsorbent material in each zone of a plurality of zones, with all of said zones having their inlet and outlet openings circumferentially spaced about a common axis; continuously directing the flow of the natural gas so that it will make a first passage through at least one of said zones and then a second passage through at least an additional one of said zones so that the water vapor and condensable hydrocarbons in the natural gas will be adsorbed by the beds of adsorbent material therein; continuously heating and recycling a flow of gas through the remainder of said zones to vaporize the water and condensable hydrocarbons contained in the beds of adsorbent material therein; redirecting the flows of the natural gas and the flow of the heated gas through said zones by shifting the flow passages by a simultaneous rotary movement of the gas paths so that each zone will become in succession a reactivation zone and a dehydration zone; continuously withdrawing a portion of the heated gas from its recycling path after its passage through the dehydrater; condensing and recovering the water and condensable hydrocarbons from the withdrawn hot gas; and continuously supplying additional gas to the recycled gas to compensate for the gas withdrawn.

References Cited in the file of this patent

UNITED STATES PATENTS

| | | |
|---|---|---|
| 1,300,869 | Pitts | Apr. 15, 1919 |
| 1,948,779 | Abbott et al. | Feb. 27, 1934 |
| 2,355,024 | Yerrick et al. | Aug. 1, 1944 |
| 2,507,608 | Miller | May 16, 1950 |
| 2,535,902 | Dailey | Dec. 26, 1950 |
| 2,630,191 | Miller | Mar. 3, 1953 |
| 2,635,707 | Gilmore | Apr. 21, 1953 |